(12) United States Patent
Ichinose et al.

(10) Patent No.: US 7,058,945 B2
(45) Date of Patent: Jun. 6, 2006

(54) INFORMATION PROCESSING METHOD AND RECORDING MEDIUM THEREFOR CAPABLE OF ENHANCING THE EXECUTING SPEED OF A PARALLEL PROCESSING COMPUTING DEVICE

(75) Inventors: Katsumi Ichinose, Shizuoka (JP); Katsuyoshi Moriya, Shizuoka (JP)

(73) Assignee: Fujitsu Limited, Kawasaki (JP)

( * ) Notice: Subject to any disclaimer, the term of this patent is extended or adjusted under 35 U.S.C. 154(b) by 448 days.

(21) Appl. No.: 09/838,166

(22) Filed: Apr. 20, 2001

(65) Prior Publication Data

US 2002/0078125 A1   Jun. 20, 2002

(30) Foreign Application Priority Data

Nov. 28, 2000   (JP)   .............................. 2000-360397

(51) Int. Cl.
G06F 9/46   (2006.01)
(52) U.S. Cl. .................... 718/102; 717/149; 717/150
(58) Field of Classification Search ........ 718/100–108; 712/1, 228, 244, 236; 717/149–150
See application file for complete search history.

(56) References Cited

U.S. PATENT DOCUMENTS

| | | | | |
|---|---|---|---|---|
| 4,965,718 A | * | 10/1990 | George et al. ............... | 718/104 |
| 5,043,873 A | * | 8/1991 | Muramatsu et al. ........ | 711/119 |
| 5,151,991 A | * | 9/1992 | Iwasawa et al. ............ | 717/150 |
| 5,202,987 A | * | 4/1993 | Bayer et al. ................. | 718/102 |
| 5,367,678 A | * | 11/1994 | Lee et al. .................... | 718/104 |
| 5,410,696 A | * | 4/1995 | Seki et al. ................... | 717/149 |
| 5,452,461 A | * | 9/1995 | Umekita et al. ............. | 717/149 |
| 5,481,747 A | * | 1/1996 | Kametani .................... | 718/102 |
| 5,535,393 A | * | 7/1996 | Reeve et al. ................ | 717/149 |
| 5,630,128 A | * | 5/1997 | Farrell et al. ............... | 718/103 |
| 5,812,844 A | * | 9/1998 | Jones et al. ................. | 718/104 |
| 5,815,727 A | * | 9/1998 | Motomura ..................... | 712/1 |
| 6,078,945 A | * | 6/2000 | Hinsley ...................... | 718/105 |
| 6,256,704 B1 | * | 7/2001 | Hlava et al. ................. | 711/112 |
| 6,286,027 B1 | * | 9/2001 | Dwyer et al. ............... | 718/107 |
| 6,330,661 B1 | * | 12/2001 | Torii .......................... | 712/228 |

(Continued)

FOREIGN PATENT DOCUMENTS

EP   400328 A   * 12/1990

(Continued)

OTHER PUBLICATIONS

Polychronopoulos et al., "Utilizing Multidimensional Loop Parallelism On Large-Scale Parallel Processor Systems", pp. 1285-1296, IEEE, vol. 38, No. 9, Sep. 1989.*

(Continued)

*Primary Examiner*—Meng-Al T. An
*Assistant Examiner*—Jennifer N. To
(74) *Attorney, Agent, or Firm*—Staas & Halsey LLP (57) ABSTRACT

There is provided an information processing method which enhances the executing speed of a parallel processing computing device. A parallel processing block-forming step divides a program to be executed into a plurality of parallel processing blocks. A thread-forming step divides parallel processing blocks formed by the parallel processing block-forming step into a plurality of threads corresponding in number to the processors of a processor group. The processor group executes the threads generated by the thread-forming step. The instructing step instructs each of the processors to execute a thread of a next parallel processing block when it has terminated execution of a thread assigned thereto, and when a predetermined instruction is not given in the program.

6 Claims, 10 Drawing Sheets

U.S. PATENT DOCUMENTS

| | | | |
|---|---|---|---|
| 6,378,066 B1 * | 4/2002 | Lewis | 712/236 |
| 6,389,446 B1 * | 5/2002 | Torii | 718/100 |
| 6,418,458 B1 * | 7/2002 | Maresco | 718/103 |
| 6,418,460 B1 * | 7/2002 | Bitar et al. | 718/108 |
| 6,651,163 B1 * | 11/2003 | Kranich et al. | 712/244 |
| 6,718,484 B1 * | 4/2004 | Kodera | 714/35 |
| 6,725,448 B1 * | 4/2004 | Moriya et al. | 717/119 |
| 2002/0004966 A1 * | 1/2002 | Wakat et al. | 15/257.06 |
| 2002/0099760 A1 * | 7/2002 | Liang | 709/107 |
| 2002/0147760 A1 * | 10/2002 | Torii | 709/107 |

FOREIGN PATENT DOCUMENTS

JP       2001167060 A  *  6/2001

OTHER PUBLICATIONS

Wang et al., "Efficient Processor Assigment Algorithms And Loop Transformations For Executing Nested Parallel Loops On Multiprocessors", pp. 71-82, IEEE, vol. 3, No. 1, Jan. 1992.*

Japanese Office Action for corresponding Japanese Patent Application No. 2000-360397 dated Dec. 6, 2005.

Matsuda et al., Hybrid Scheduling System for Fine Grain Parallelism: Scheduling Method united with Barrier Management dated Aug. 23, 1995.

* cited by examiner

```
1    INTEGER m(1000),n(2000),p(3000)
2
3    !$OMP PARALLEL
4        !$OMP DO
5            DO i=1,1000
6                m(i)=i
7            END DO
8        !$OMP END DO NOWAIT
9        !$OMP DO
10           DO i=1,2000
11               n(i)=i*2
12           END DO
13       !$OMP END DO NOWAIT
14       !$OMP DO
15           DO i=1,3000
16               p(i)=i*3
17           END DO
18       !$OMP END DO NOWAIT
19   !$OMP END PARALLEL
20   END
```

| FIRST THREAD | SECOND THREAD | THRID THREAD | FOURTH THREAD | FIFTH THREAD | FOREMOST ONE |
|---|---|---|---|---|---|
| 1 | – | – | – | – | 1 |
| 1 | 1 | 1 | 1 | – | 1 |
| 1 | 2 | 1 | 1 | 1 | 2 |
| ⋮ | ⋮ | ⋮ | ⋮ | ⋮ | ⋮ |
| 3 | 2 | 2 | 2 | 2 | 3 |
| 3 | 3 | 3 | 3 | 3 | 3 |

INFORMATION PROCESSING METHOD AND RECORDING MEDIUM THEREFOR CAPABLE OF ENHANCING THE EXECUTING SPEED OF A PARALLEL PROCESSING COMPUTING DEVICE

BACKGROUND OF THE INVENTION (1) Field of the Invention

This invention relates to an information processing method and a recording medium, and more particularly to an information processing method and a recording medium which are capable of causing a computing device having a plurality of processors to carry out predetermined information processing.

(2) Description of the Related Art

When a computing device having a plurality of processors is caused to execute a program, there has been generally employed a method of dividing the program into a plurality of parallel processing blocks, and dividing each of the obtained parallel processing blocks into threads which are basic units for processing, and assigning the threads to the processors.

Figure 10:
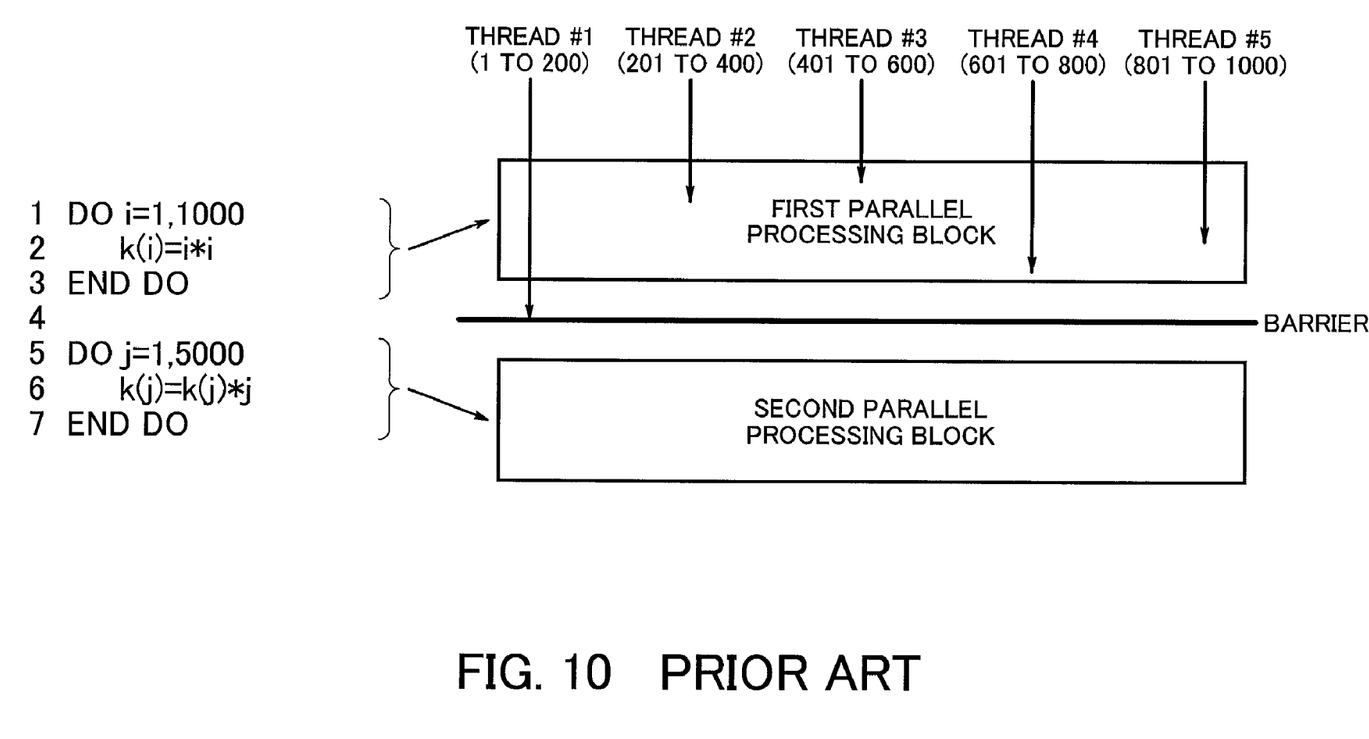
FIG. 10 is a diagram which is useful in explaining how threads are executed by the prior art.

FIG. 10 is a diagram showing a case in which a program on a left-hand side as viewed in the figure is executed by the above method by using a computing device having five processors. In this example, the program to be executed includes two loops to be executed (line numbers "1" to "3" and line numbers "5" to "7") which are set to a first parallel processing block and a second parallel processing block, respectively.

When the above program is executed, threads #1 to #5 are generated as basic units to be processed by the respective processors. The thread #1 takes its share of a first loop (loop with line numbers "1" to "3") with a variable i within a range of "1" to "200". The thread #2 takes its share of the same first loop with the variable i within a range of "201" to "400". Similarly, the threads #3, #4, and #5 take their shares of the first loop with the variable i within ranges of "401" to "600", "601" to "800", and "801" to "1000", respectively.

In the conventional method, however, a monitoring mechanism called "barrier" is arranged between the parallel processing blocks to thereby hold a next parallel processing block from being executed until processing of all the threads is completed.

As a result, when a plurality of parallel processing blocks are to be processed, a time period required for processing all the blocks becomes equal to a sum of the longest time periods each of which is taken to process the most time-consuming one of the threads of each parallel processing block. As a result, it is sometimes impossible to make effective use of the processor resources.

SUMMARY OF THE INVENTION

The present invention has been made in view of the above circumstances, and an object thereof is to provide an information processing method which is capable of making effective use of processor resources, thereby reducing a processing time.

To attain the above object, the present invention provides an information processing method for causing a computing device having a plurality of processors to carry out predetermined information processing. The information processing method comprises a parallel processing block-forming step for dividing a program to be executed into a plurality of parallel processing blocks, a thread-forming step for dividing said parallel processing blocks formed by said parallel processing block-forming step, into threads which are basic units to be assigned respectively to said plurality of processors for being processed thereby, and an instructing step for instructing a predetermined processor to execute a next parallel processing block when said predetermined processor has terminated execution of said thread assigned thereto.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENT

A preferred embodiment of the present invention will be described below with reference to accompanying drawings.

Figure 1:
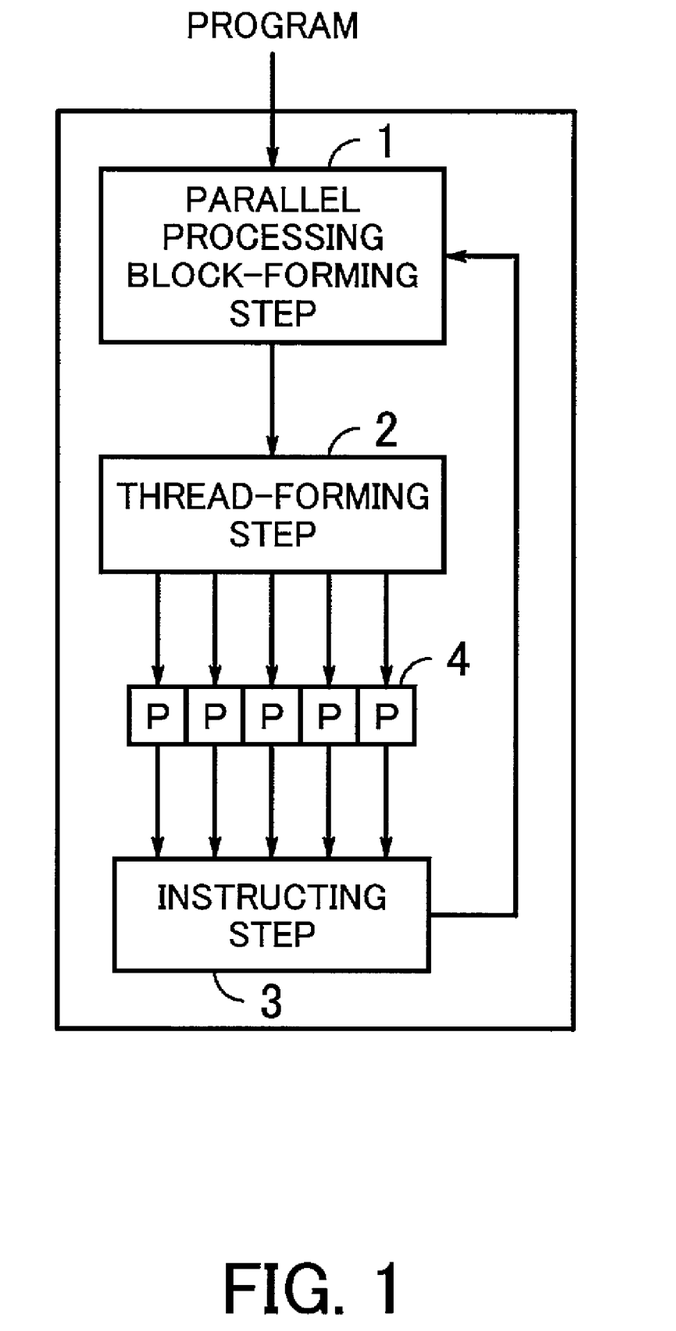
FIG. 1 is a diagram useful in explaining the operating principles of the present invention.

FIG. 1 is a diagram showing the principles of an information processing method according to the invention. As shown in FIG. 1, the information processing method according to the invention is directed to causing an information processing system including a processor group 4 to carry out predetermined information processing. The information processing method according to the invention comprises s a parallel processing block-forming step 1, a thread-forming step 2, and an instructing step 3.

The parallel processing block-forming step 1 divides a program to be executed into a plurality of parallel processing blocks.

The thread-forming step 2 divides the parallel processing blocks into threads which are basic units to be assigned respectively to the processors of the processor group 4, for being processed thereby.

The instructing step 3 instructs a predetermined processor to execute a next parallel processing block when the processor has terminated execution of the thread assigned thereto, whereas when a predetermined instruction is given in the program, the instructing step 3 does not instruct execution of a next parallel processing block until processing of all the threads has been completed.

Next, the above operations illustrated in FIG. 1 showing the principles of the information processing method will be described in detail hereinafter.

Now, when a program to be executed is input, the parallel processing block-forming step 1 divides the program into a plurality of parallel processing blocks. It should be noted that the term "parallel processing block" is used to mean a processing unit, such as a loop process, which has certain properties of a functional unit. Therefore, when a plurality of loop processes are included in a program, they are divided as respective parallel processing blocks.

The thread-forming step 2 sequentially obtains the parallel processing blocks generated by the parallel processing block-forming step 1 in the order of execution, and divides each of them into threads which should be processed by the respective processors. In the example illustrated in FIG. 1, five processors exist, and therefore each parallel processing block is divided into five threads.

The processor group 4 processes the threads generated by the thread-forming step 2 in a manner such that each processor of the group processes a thread assigned thereto. At this time, since details of processing executed by the respective processors are not identical, timing of termination of the processing is different between the processors.

Conventionally, termination of processing by each processor has been monitored by using a barrier until the processing of the whole processing block is completed. Therefore, even if a processor has completed its processing earlier than the others, the processor has to wait for all the others to complete their processing.

In the present invention, however, when a predetermined processor has completed its processing, the instructing step 3 instructs execution of a next parallel processing block unless a predetermined instruction is given in the program. Hence, the processor that has completed execution of a thread assigned thereto earlier than the others can execute a thread of the next parallel processing block.

After threads continue to be executed, if the predetermined instruction in the program is reached, the instructing step 3 holds the program from proceeding to a next parallel processing block. This enables all the threads to be synchronized with each other.

As described above, although in the conventional method, a sum of the longest time periods each of which is taken to process the most time-consuming one of the threads of each parallel processing block has been an execution time of the program, according to the information processing method of the invention, it is possible to shorten the program execution time unless all threads requiring the longest execution time periods are assigned to a particular processor.

Next, the embodiment according to the invention will be described hereinafter.

Figure 2:
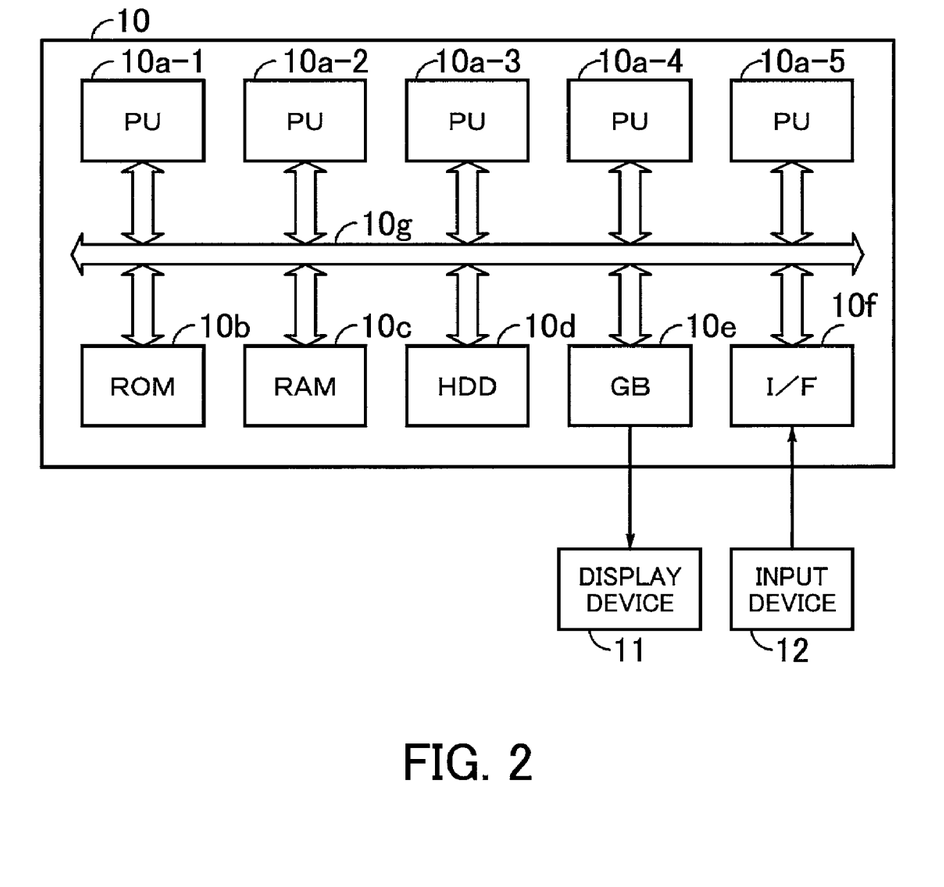
FIG. 2 is a block diagram showing an example of the arrangement of an embodiment according to the invention.

FIG. 2 shows an example of the arrangement of an information processing system for carrying out the information processing method according to the embodiment of the invention.

In this embodiment, the information processing system 10 is comprised of PUs (Processor Units) 10a-1 to 10a-5, a ROM (Read Only Memory) 10b, a RAM (Random Access Memory) 10c, an HDD (Hard Disk Drive) 10d, a GB (Graphics Board) 10e, an I/F (interface) 10f, and a bus 10g.

The information processing system 10 has peripheral devices, such as a display device 11 and an input device 12, connected thereto.

The PUs 10a-1 to 10a-5 perform various computational operations according to a program stored in the HDD 10d and controls operations of components of the system.

The ROM 10b stores basic programs and data to be executed and processed by the PUs 10a-1 to 10a-5.

The RAM 10c temporarily stores programs and data being executed and processed by the PUs 10a-1 to 10a-5.

The HDD 10d stores programs and data for execution and processing by the PUs 10a-1 to 10a-5. More specifically, the HDD 10d stores an OS (Operating System) which is a basic program for managing the system and providing a basic user operating environment, as well as a compiler, a linker, an application program and the like, which are to be executed by the PUs 10a-1 to 10a-5, according to the invention.

The GB 10e carries out an imaging process according to an imaging command supplied from the PUs 10a-1 to 10a-5, and converts an obtained image to a video signal to output the same.

The I/F 10f performs inputting of data received from the input device 12 by converting the data to an expression form used by the system.

The bus log connects the PUs 10a-1 to 10a-5, the ROM 10b, the RAM 10c, the HDD 10d, the GB 10e, and the I/F 10f to each other, thereby making it possible to send and receive data therebetween.

It should be noted that the PUs 10a-1 to 10a-5 are capable of carrying out parallel processing in which a program to be executed is divided into a plurality of parallel processing blocks and then processed. When the ROM 10b and the like, which are shared resources, are accessed by the PUs during execution of the parallel processing, exclusive access control is carried out such that the access by one PU is not adversely affected by access by the other processor units.

Although in the above example, description of the arrangement of the embodiment is partially omitted for simplicity, it is only essentially required that the information processing system has a plurality of PUs which are capable of operating independently of each other.

Figure 3:
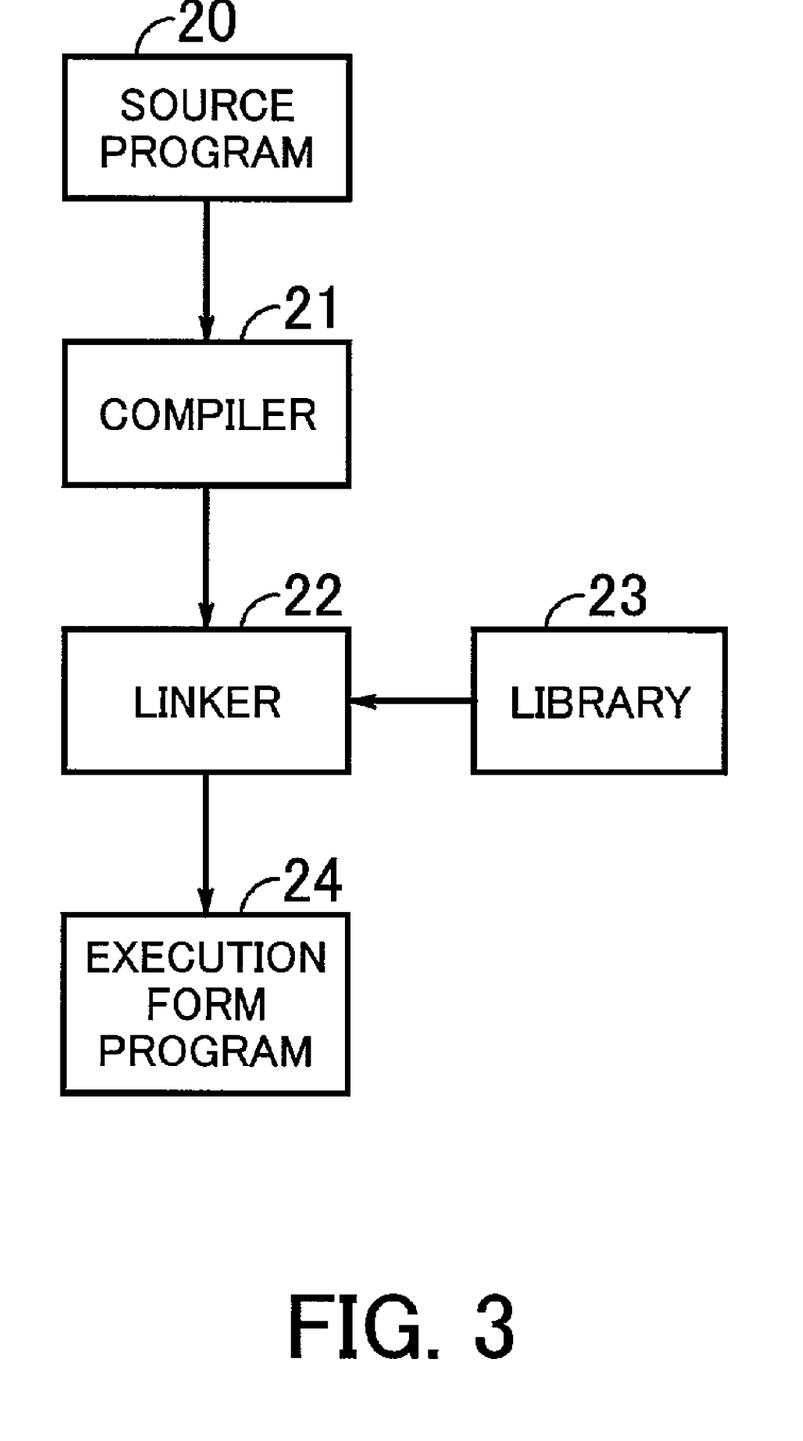
FIG. 3 is a diagram showing the relationship existing between a compiler, a linker, and a library according to the invention when an OS (Operating System) stored in the HDD is started up in the FIG. 2 embodiment, and the compiler, the linker and the library are executed on the OS.

FIG. 3 is a diagram showing the relationship between the compiler, the linker, and a library according to the invention which are executed on the OS which is started up by reading from the HDD 10d in the FIG. 2 embodiment. As shown in FIG. 3, a source program 20 to be executed is compiled (translated) by the compiler 21, and necessary ones of programs stored in the library 23 which are basic programs are added to the source program 20 by the linker 22, thereby generating an execution form program 24. It should be noted that the invention is concerned with details of the library 23, and the use of a novel control method described hereinafter makes it possible to increase processing speed of the parallel processing.

Figure 4:
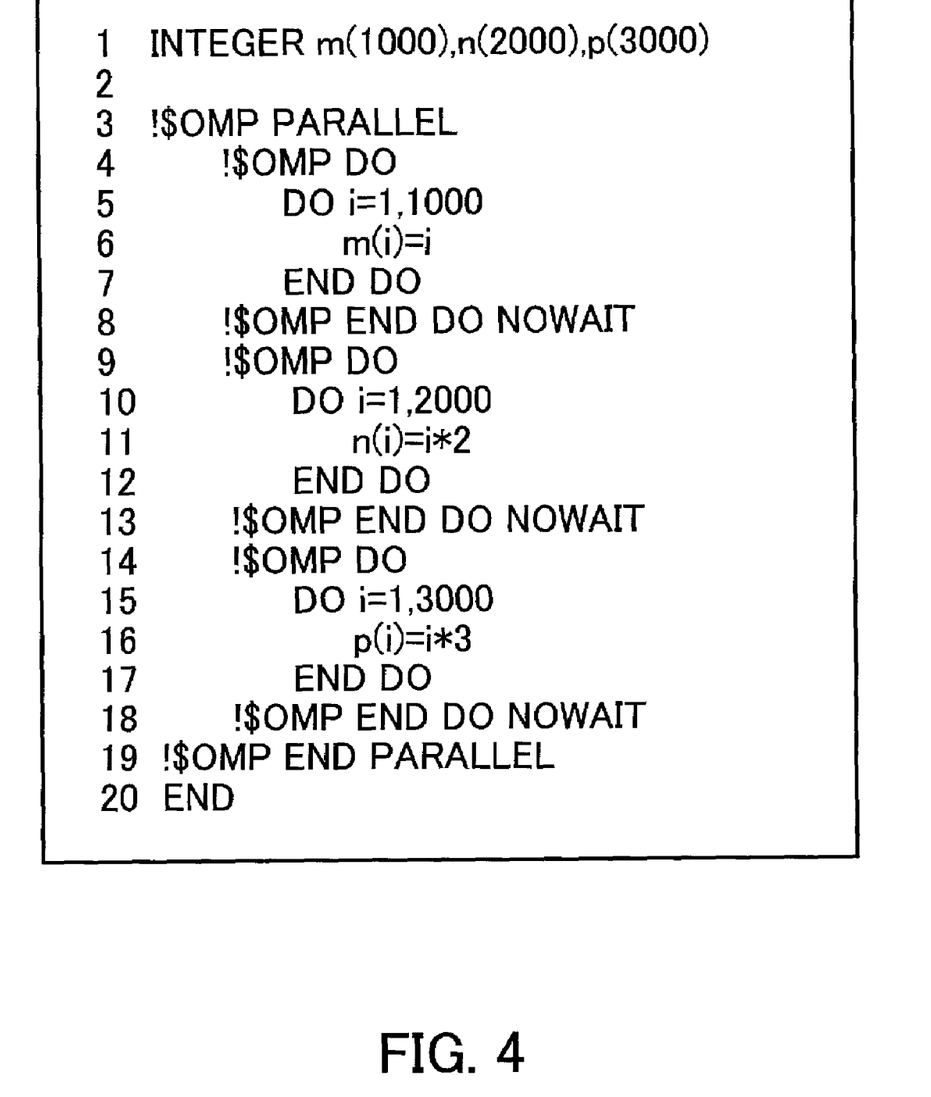
FIG. 4 is a diagram showing an example of a source program appearing in FIG. 3.

FIG. 4 shows an example of the source program 20 appearing in FIG. 3.

In this source program 20, line number "1" declares arrays m, n, and p of an integer type, with the respective numbers of elements of 1000, 2000 and 3000. Line number "3" declares execution of parallel processing. This declaration forms a pair together with a declaration of "END" shown by line number "19". A process indicated by line numbers "4" to "8" forms a loop process which is carried out for storing the value of a variable i as each element of the array m. Also, a process indicated by line numbers "9" to "13" forms another loop process which is executed for storing a value obtained by multiplying the variable i by two as each element of the array n. Further, a process indicated by line numbers "14" to "15" forms still another loop process which is carried out for storing a value obtained by multiplying the variable i by three as each element of the array p.

Hereinafter, the process indicated by line numbers "4" to "8" is referred to as "the first loop process", the process indicated by line numbers "9" to "13" is referred to as "the second loop process", and the process indicated by line numbers "14" to "18" is referred to as "the third loop process". "NOWAIT" appearing in line numbers "8", "13" and "18" means that wait processing should not be carried out. A barrier function is held from execution by adding this declaration.

It should be noted that the number of parallel processes can be designated by a program, not shown, for initialization of the system. Further, in the source program 20 as well, it is possible to specify the number of parallel processes as desired by a predetermined command written therein.

As described hereinabove, the source program 20 is translated by the compiler 21, and after necessary ones of the programs included in the library 23 are added by the linker 22, the source program 20 is converted to the execution form program 24. Further, when compiling, the source program 20 is divided into parallel processing blocks as units of parallel processing, and parallel processing block numbers which are unique numbers are added to the respective parallel processing blocks. In the example of the source program illustrated in FIG. 4, each of the first to third loop processes is a parallel processing block, so that parallel processing block numbers of one to three, for instance, are added to the respective parallel processing blocks.

Figure 5:
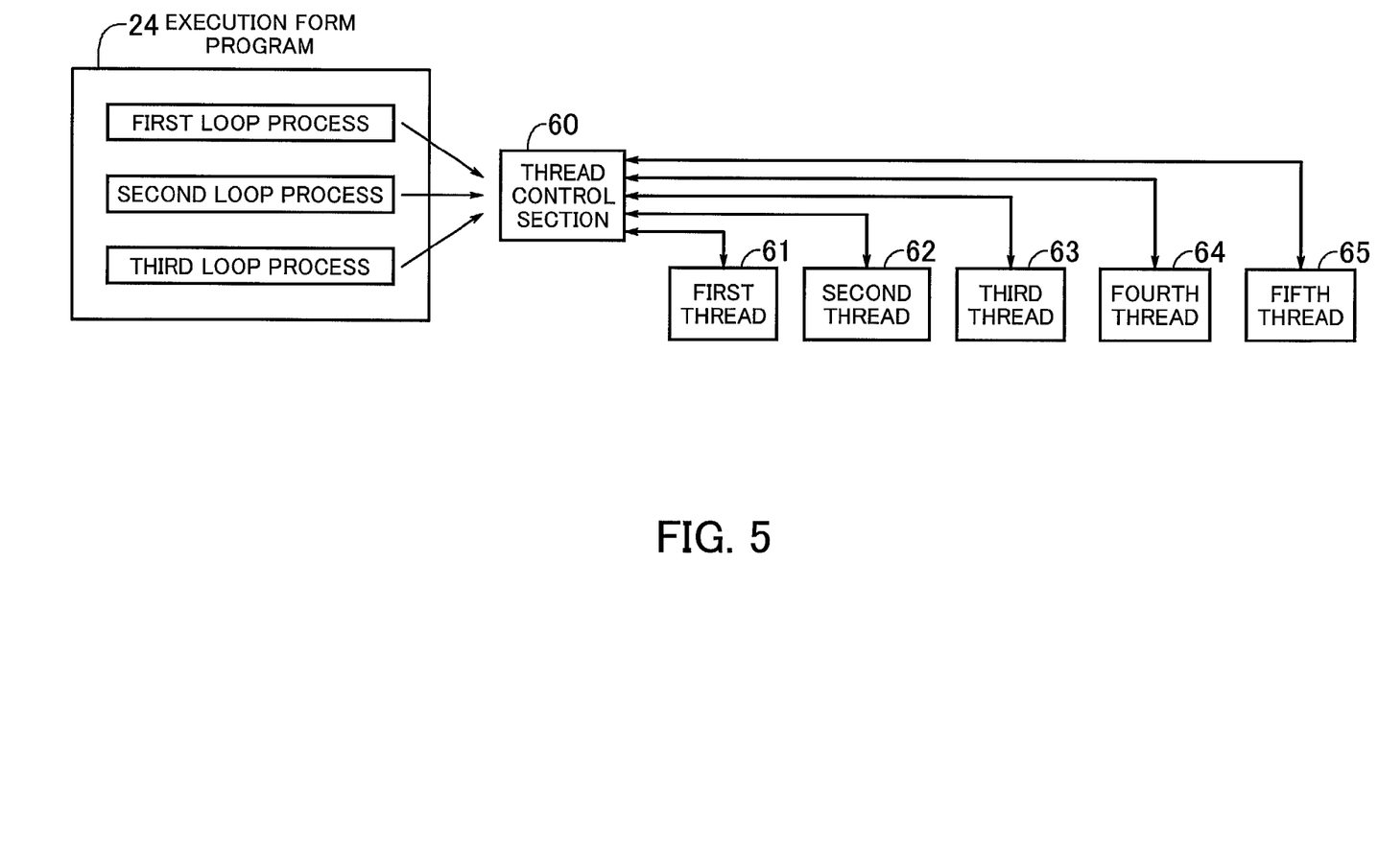
FIG. 5 is a block diagram which is useful in explaining an operation carried out when an execution form program is executed.

FIG. 5 is a diagram which is useful in explaining an operation carried out when the execution form program 24 is executed. In FIG. 5, the execution form program 24 is generated by compiling the FIG. 4 source program 20 into machine language, and includes the first to third loop processes described above. A thread control section 60 and first to fifth threads 61 to 65 are programs added by the linker 22 for carrying out parallel processes, and they are subroutine programs called from the execution form program 24 for execution.

Now, when the thread control section 60 is called from the first to third loop processes which are parallel processing blocks, the thread control section 60 starts the first to fifth threads 61 to 65 for causing the parallel processes to be carried out and controlling the states of execution of the threads. The first to fifth threads are basic units of processes executed by the PUs 10a-1 to 10a-5.

Figure 6:
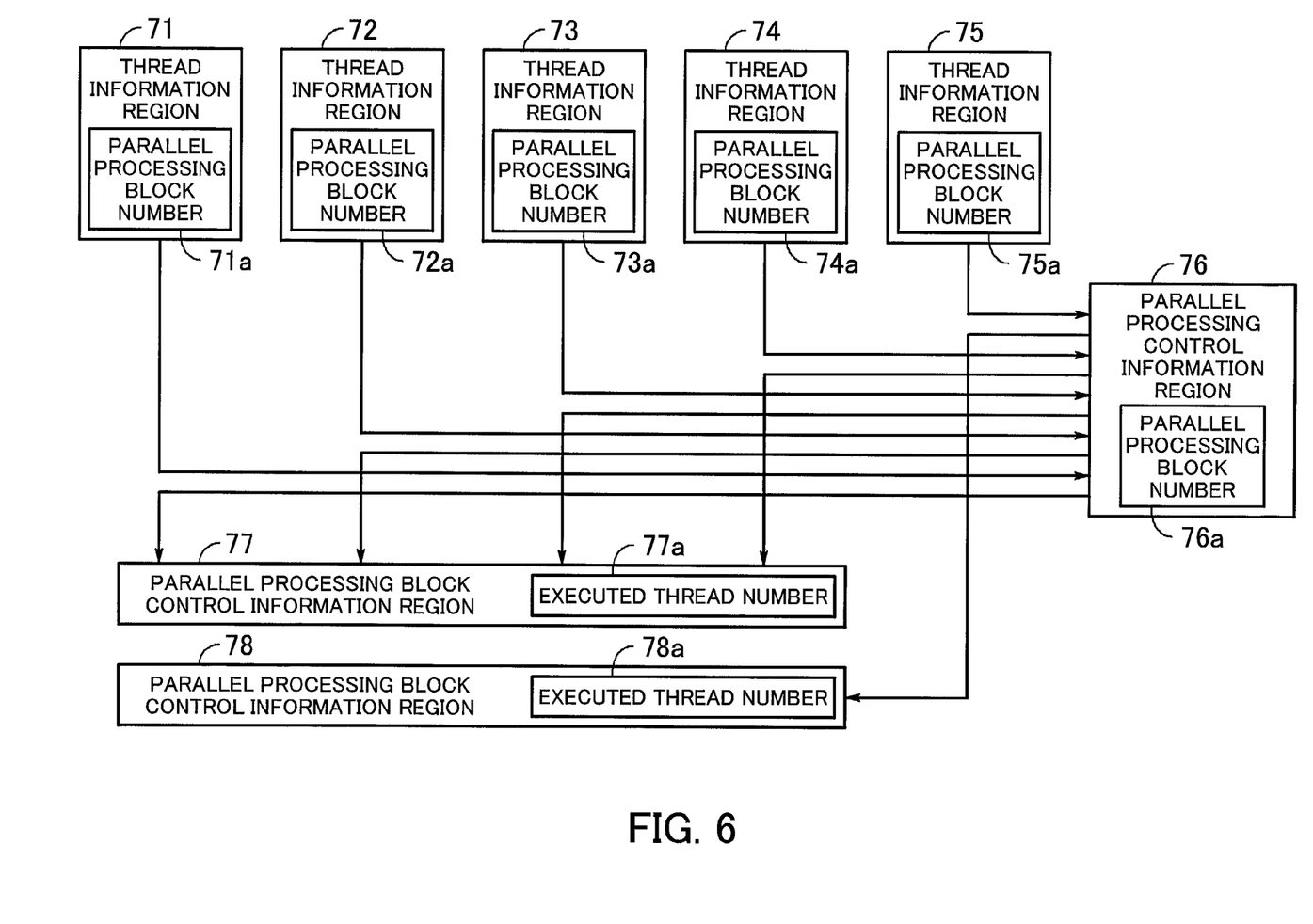
FIG. 6 is a block diagram showing memory regions of a RAM allocated to a thread control section and first to fifth threads shown in FIG. 5.

FIG. 6 shows memory regions of the RAM 10c allocated to the FIG. 5 thread control section 60 and first to fifth threads 61 to 65 when they are executed. In FIG. 6, thread information regions 71 to 75 are assigned to the respective first to fifth threads 61 to 65, and store respective parallel processing block numbers 71a to 75a indicative of the numbers of parallel processing blocks which the respective threads are executing at the present time. A parallel processing control information region 76 is assigned to the thread control section 60, and stores a parallel processing block number 76a indicative of the number of a parallel processing block executed by a foremost thread.

Parallel processing block control information regions 77 and 78 are generated in a manner corresponding to parallel processing blocks being executed at the present time. The parallel processing block control information regions 77 and 78 store executed thread numbers 77a and 78a indicative of the number of threads of the respective parallel processing blocks which have already been terminated. In the illustrated example, the two parallel processing block control information regions 77 and 78 are generated and correspond to respective states of execution of the two parallel processing blocks. Further, in this example, the first thread 61 to the fourth thread 64 are executing a parallel processing block corresponding to the parallel processing block control information region 77, while the fifth thread 65 is executing a parallel processing block corresponding to the parallel processing block control information region 78.

It should be noted that when three or more parallel processing blocks are being executed, parallel processing block control information regions corresponding in number to the parallel processing blocks are generated, whereas when one parallel processing block is being executed, one parallel processing block control information region is generated.

Next, operations shown in the block diagrams in FIGS. 5 and 6 which are carried out during execution of the execution form program 24 generated from the FIG. 4 source program 20 will be described with reference to FIG. 7.

When the execution form program 24 is started up, the first loop process having a parallel processing block number "1" is set to a process to be executed. In the first loop process, the thread control section 60 is called by subroutine call with arguments specified therefor, and is requested to start the loop process. The thread control section 60 sets the parallel processing block number of the parallel processing control information region 76 to "1", generates the parallel processing block control information region 77, and initializes the executed thread number 77a to "0", Then, the thread control section 60 generates the first to fifth threads to start execution of the first loop process. The first to fifth threads 61 to 65 each have the thread information regions 71 to 75 assigned thereto while storing the parallel processing block number "1" corresponding to the first loop process being carried out at the present time as the parallel processing block numbers 71a to 75a.

Figure 7:
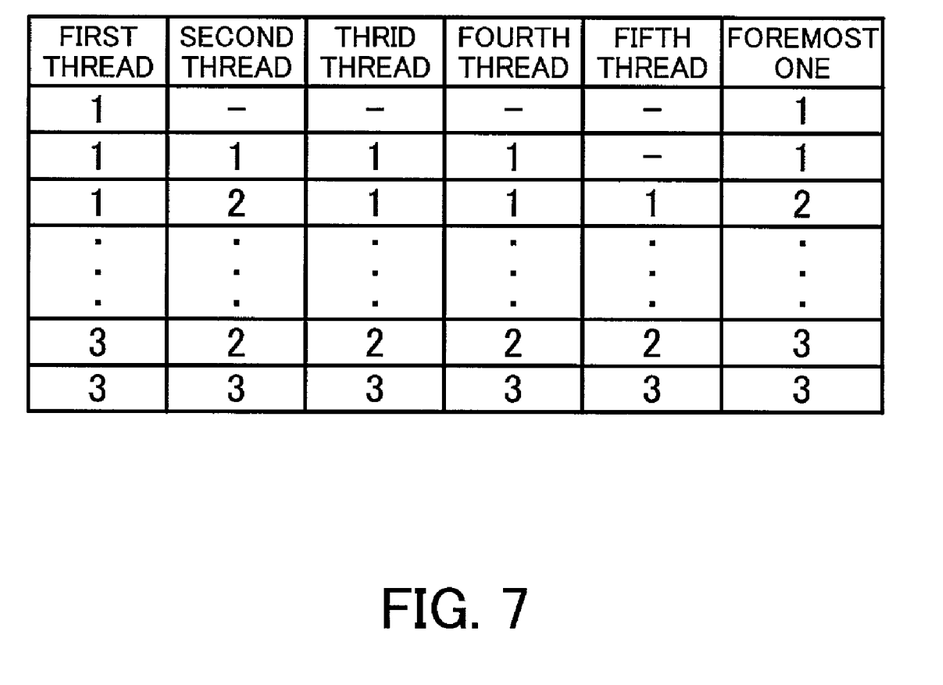
FIG. 7 is a diagram which is useful in explaining operations shown in the block diagrams in FIGS. 5 and 6 which are carried out during execution of an execution form program generated from the FIG. 4 source program.

FIG. 7 is a diagram showing data stored in the thread information regions 71 to 75 and the parallel processing control information region 76. In FIG. 7, a first column at a left-side end to a fifth column correspond to the thread information regions 71 to 75, respectively, whereas a column at a right-side end corresponds to the parallel processing control information region 76. A first line in FIG. 7 indicates an initial state of the first loop process being started, on which only the first thread 61 has the parallel processing block number "1" stored therein while the other threads have not yet stored the same. On a second line, all the columns other than the fifth column have stored the parallel processing block number "1", which indicates that all the threads other than the fifth thread 65 are executing the first loop process.

In the above state, when the second thread 62 has terminated execution of the first loop process, the thread control section 60 is notified of the fact. Then, the thread control section 60 detects that the first process loop has "NOWAIT" added at an end thereof to thereby recognize that the second thread should proceed to a next process without executing the barrier function, and first updates the executed thread number 77a from "0" to "1". Next, the thread control section 60 updates the parallel processing block number 76a in the parallel processing control information region 76 from "1" to "2", then generates the parallel processing block control information region 78 corresponding to the second loop process and initializes the executed thread number 78a to "0".

When such operations as described above are repeatedly carried out, and all the threads have terminated processing of the first loop process, the executed thread number 77a becomes equal to "5". At this time, the parallel processing block control information region 77 is deleted from the RAM 10c.

When all the threads have terminated the third loop process, all the parallel processing block numbers 71a to 75a become equal to "3" as shown by the last line in FIG. 7, and the execution of the program has been completed.

Figure 8:
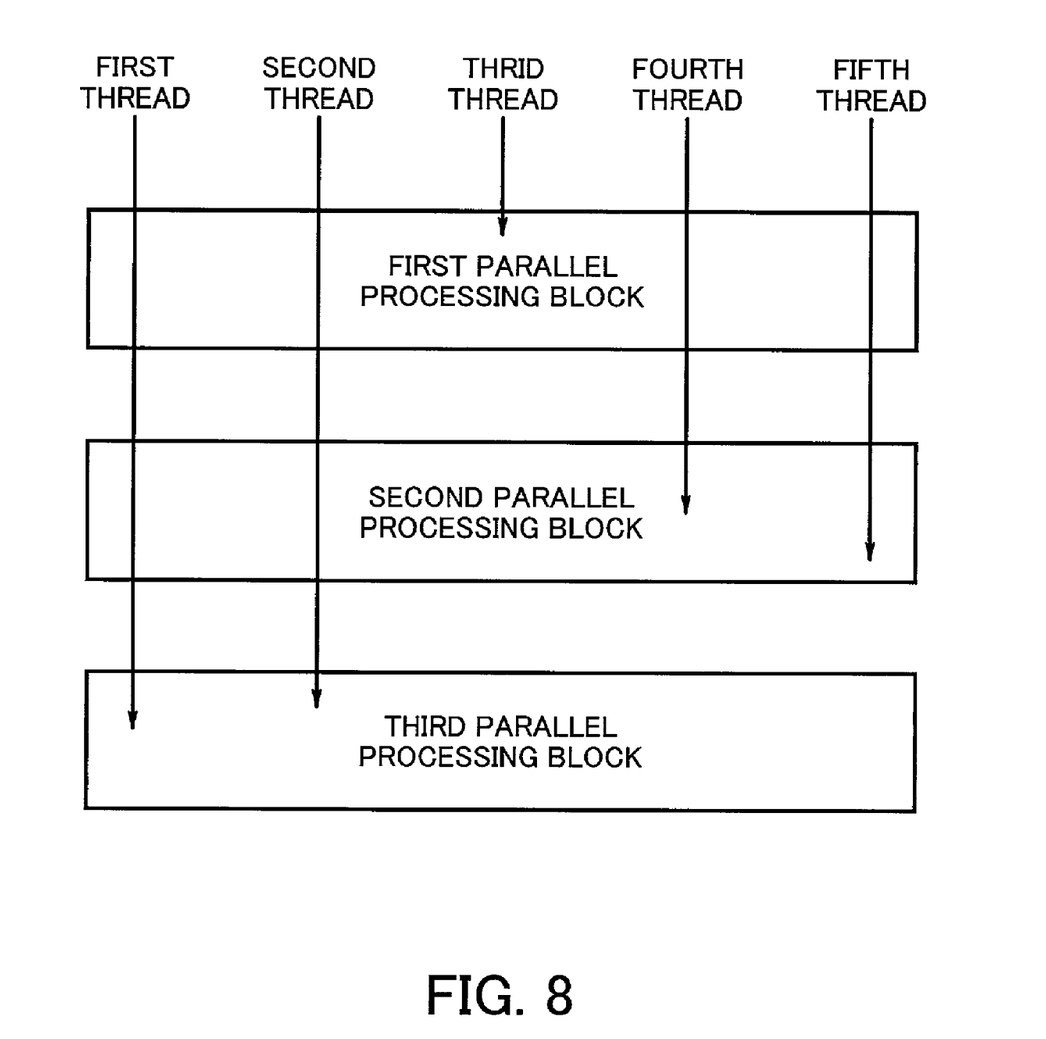
FIG. 8 is a diagram which is useful in explaining how threads are executed by the embodiment.

Therefore, according to the embodiment described above, differently from an example of the prior art illustrated in FIG. 10, that is, the barrier function is not carried out as shown in FIG. 8, but each thread executes a next parallel processing block irrespective of the states of execution of the other threads. Therefore, in contrast to the FIG. 10 conventional case in which a total program execution time is a sum of the longest time periods each of which is taken to process the most time-consuming one of the threads of each parallel processing block, it is possible in the present embodiment to execute the program in a time period shorter than in the conventional case.

Although in the above embodiment, the case in which the five PUs 10a-1 to 10a-5 process five threads is described by way of example, this is not limitative, but it goes without saying that the present invention can be applied to other combinations of PUs and threads.

Further, although in the above embodiment, threads are managed by the library 23, this is not limitative, but it is possible to obtain the same advantageous effects as provided by the embodiment if similar programs are added to the execution form program 24 by using the compiler 21. To this end, in-line expansion or macros, for instance, can be employed for the above addition.

Still further, in the above embodiment, since "NOWAIT" is added to an end of every parallel processing block, each thread is permitted to continue to carry out processing operations up to the last parallel processing block independently of the other threads. Here, if "NOWAIT" is omitted, it is possible to once cause the threads to keep pace with each other. As described above, by adding "NOWAIT" as required, the barrier function can be made effective or ineffective.

Figure 9:
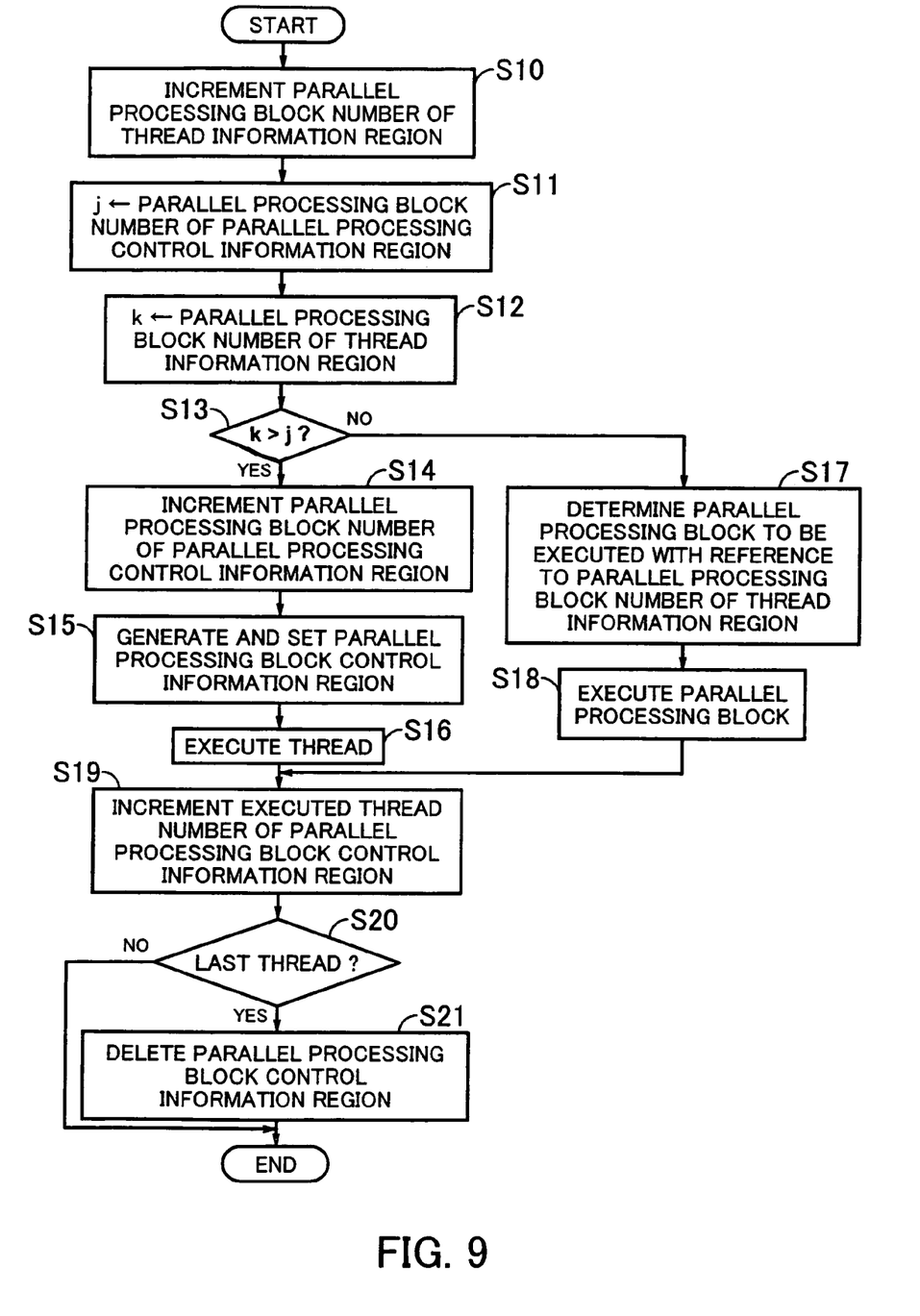
FIG. 9 is a flowchart which is useful in explaining an example of processing executed by a thread control section shown in FIG. 5.

Next, referring to FIG. 9, processing carried out by the thread control section 60 will be described based on a flowchart shown therein. This flowchart corresponds to a process called for execution when the first to fifth threads 61 to 65 have terminated processing operations. When the flowchart is started, the following steps are carried out.

Step S10:
The parallel processing block number of a corresponding thread information region is incremented by "1".

Step S11:
The parallel processing block number of the parallel processing control information region is assigned to a variable j.

Step S12:
The parallel processing block number of a corresponding thread information region is assigned to a variable k.

Step S13:
It is determined whether k exceeds j, that is, whether the thread should execute a new parallel processing block that has no corresponding parallel processing block control information region. If the thread should execute a new parallel processing block, the program proceeds to a step S14, whereas if not, the program proceeds to a step S17.

Step S14:

The parallel processing block number 76a of the parallel processing control information region 76 is incremented by "1".

Step S15:
A parallel processing block control information region corresponding to the new parallel processing block is generated, and an executed thread number therefor is initialized to "0".

Step S16:
Execution of a new thread is started.

Step S17:
A parallel processing block to be executed is determined with reference to the parallel processing block number of the thread information region.

Step S18:
The parallel processing block specified at the step S17 is executed.

Step S19:
The executed thread number of the corresponding parallel processing block control information region is incremented by "1".

Step S20:
If the executed thread number becomes equal to the number ("1" in the FIG. 6 example) of the threads as a result of the increment at the step S19, the program proceeds to a step S21, whereas if not, the processing operation is terminated.

Step S21:
The parallel processing block control information region corresponding to the processed parallel processing block is deleted.

According to the above processing operation, it is possible to realize the functions of the system described hereinabove.

Finally, the above processing functions can be implemented by a computer. In such a case, the details of processing functions that the information processing system should have are described in a program stored in a computer-readable storage medium. By executing the program by a computer, it is possible to perform the above-described processes. The computer-readable recording medium includes a magnetic recording device, semiconductor memory and the like. To distribute the program to the market, the program may be stored in portable storage media such as CDROMs (Compact Disk Read Only Memories) or floppy disks. Alternatively, the program may be stored in a storage device of a computer connected to a network and may be transferred to other computers through the network. To execute the program by a computer, the program stored in a hard disk unit or the like of the computer is loaded into the main memory and executed.

As described hereinabove, according to the invention, an information processing method for causing a computing device having a plurality of processors to carry out predetermined information processing comprises a parallel processing block-forming step for dividing a program to be executed into a plurality of parallel processing blocks, a thread-forming step for dividing the parallel processing blocks generated by the parallel processing block-forming step into threads which are basic units to be assigned respectively to the plurality of processors for being processed thereby, and an instructing step for instructing a predetermined processor to execute a next parallel processing block when the predetermined processor has terminated execution of the thread assigned thereto. Therefore, when the parallel processing blocks are successively processed, delay of processing conventionally caused by barriers can be eliminated, which makes it possible to increase the processing speed.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-implemented parallel processing method for causing a computing device having a plurality of processors to carry out predetermined information processing, the method comprising:
   dividing a program to be executed into a plurality of parallel processing blocks;
   dividing said parallel processing blocks into threads which are basic units to be assigned respectively to said plurality of processors for being processed thereby;
   providing a parallel processing control information region indicating a first parallel processing block number;
   providing, for each of the plurality of threads, a thread information region indicating a second parallel processing block number;
   providing a parallel processing block control information region containing an executed thread number;
   causing each processor to increment the second parallel processing block number of the thread information region corresponding thereto when said each processor has finished a currently parallel processing block and, when the incremented second parallel processing block number exceeds the first parallel processing block number, causing each processor to update the first parallel processing block number accordingly and creating a new parallel processing block control information region corresponding to the updated first parallel processing block number; and
   causing each processor to increment the executed thread number in the corresponding parallel processing block control information region when said each processor has finished a current parallel processing block thereof, and causing said each processor to delete the parallel processing block control information region when the incremented executed thread number equals a total number of threads.

2. The method according to claim 1, wherein when a predetermined instruction is given in said program to be executed, execution of a next parallel processing block is not instructed by said instructing step until processing of all of said threads has been terminated.

3. A computer-readable recording medium which stores a program to cause a computing device having a plurality of processors to carry out predetermined information processing, said program comprising:
   parallel processing block-forming means for dividing a program to be executed into a plurality of parallel processing blocks;
   thread-forming means for dividing said parallel processing blocks generated by said parallel processing block-forming means, into threads which are basic units to be assigned respectively to said plurality of processors for being processed thereby;
   means for providing a parallel processing control information region indicating a first parallel processing block number;
   means for providing, for each of the plurality of threads, a thread information region indicating a second parallel processing block number;
   means for providing a parallel processing block control information region containing an executed thread number;
   means for causing each processor to increment the second parallel processing block number of the thread information region corresponding thereto when said each processor has finished a current parallel processing block and, when the incremented second parallel processing block number exceeds the first parallel processing block number, causing each processor to update the first parallel processing block number accordingly and creating a new parallel processing block control information region corresponding to the updated first parallel processing block number; and
   means for causing each processor to increment the executed thread number in the corresponding parallel processing block control information region when said each processor has finished a parallel processing block thereof, and causing said each processor to delete the parallel processing block control information region when the incremented executed thread number equals a total number of threads.

4. An information processing system including a plurality of processors for carrying out predetermined information processing,
   the information processing system comprising:
   parallel processing block-forming means for dividing a program to be executed into a plurality of parallel processing blocks;
   thread-forming means for dividing said parallel processing blocks generated by said parallel processing block-forming means, into threads which are basic units to be assigned respectively to said plurality of processors for being processed thereby;
   means for providing a parallel processing control information region indicating a first parallel processing block number;
   means for providing, for each of the plurality of threads, a thread information region indicating a second parallel processing block number;
   means for providing a parallel processing block control information region containing an executed thread number;
   means for causing each processor to increment the second parallel processing block number of the thread information region corresponding thereto when said each processor has finished a current parallel processing block and, when the incremented second parallel processing block number exceeds the first parallel processing block number, causing each processor to update the first parallel processing block number accordingly and creating a new parallel processing block control information region corresponding to the updated first parallel processing block number; and
   means for causing each processor to increment the executed thread number in the corresponding parallel processing block control information region when said each processor has finished a current parallel processing block thereof, and causing said each processor to delete the parallel processing block control information region when the incremented executed thread number equals a total number of threads.

5. A computer implemented method comprising:
dividing a program to executed into a plurality of parallel processing blocks;
dividing the parallel processing blocks into threads to be respectively assigned to a plurality of processors;
designated a parallel processing block number to each of the assigned threads corresponding to the parallel processing block being executed by the assigned thread at a predetermined time;
comparing the parallel processing block number corresponding to a leading thread of the assigned threads to a parallel block number corresponding to each of the assigned threads;
determining whether the leading thread should execute a next parallel processing block, wherein when execution is required, determining the next parallel processing block to be executed with reference to the parallel processing block number of the leading thread;
storing the parallel processing block number corresponding to the leading thread in a parallel processing control information region;
providing a parallel processing block control information region comprising an executed thread number;
incrementing the parallel block number corresponding to an assigned thread when the assigned thread has completed a current parallel processing block, and when the incremented parallel block number corresponding to the assigned thread exceeds the stored parallel processing block number, updating the stored parallel processing block number in the parallel processing control information region and creating a new parallel block control information region corresponding to the updated, stored parallel processing block number; and
incrementing the executed thread number in the parallel processing block control information region when each processor has completed a current parallel processing block thereof, and deleting the parallel processing block control information region when the incremented executed thread number equals a total number of threads.

6. An information processing system comprising:
means for dividing a program to be executed into a plurality of parallel processing blocks;
means for dividing the parallel processing blocks into threads to be respectively assigned to a plurality of processors;
means for designating a parallel processing block number to each of the assigned threads corresponding to the parallel processing block being executed by the assigned threads at a predetermined time;
means for comparing the parallel processing block number corresponding to a leading thread of the assigned threads to a parallel block number corresponding to each of the assigned threads;
means for determining whether the leading thread should execute a next parallel processing block, wherein when execution is required, determining the next parallel processing block to be executed with reference to the parallel processing block number of the leading thread;
means for storing the parallel processing block number corresponding to the leading thread in a parallel processing control information region;
means for providing a parallel processing block control information region comprising an executed thread number;
means for incrementing the parallel block number corresponding to an assigned thread when the assigned thread has completed a current parallel processing block, and when the incremented parallel block number corresponding to the assigned thread exceeds the stored parallel processing block number, updating the stored parallel processing block number in the parallel processing control information region and creating a new parallel block control information region corresponding to the updated, stored parallel processing block number; and
means for incrementing the executed thread number in the parallel processing block control information region when each processor has completed a current parallel processing block thereof, and deleting the parallel processing block control information region when the incremented executed thread number equals a total number of threads.

* * * * *

UNITED STATES PATENT AND TRADEMARK OFFICE
CERTIFICATE OF CORRECTION

PATENT NO. : 7,058,945 B2 Page 1 of 1
APPLICATION NO. : 09/838166
DATED : June 6, 2006
INVENTOR(S) : Katsumi Ichinose et al.

It is certified that error appears in the above-identified patent and that said Letters Patent is hereby corrected as shown below:

Column 9, line 32, change "currently" to --current--;
        line 51, after "instructed" delete "by said instructing step"; and
        line 52, change "has been" to --have been--.
Column 10, line 21, after "finished a" insert --current--.
Column 11, line 2, after "program to" insert --be--;
        line 6, change "designated" to --designating--; and
        line 8, change "thread" to --threads--.

Signed and Sealed this

Twelfth Day of September, 2006

JON W. DUDAS
*Director of the United States Patent and Trademark Office*